Patented Feb. 14, 1950

2,497,769

UNITED STATES PATENT OFFICE 2,497,769

PRECIPITATION OF ALKALI METAL SALTS OF PENICILLIN

Norman A. Hansen, Lake Bluff, and James W. Milne and William C. Risser, Waukegan, Ill., assignors to Abbott Laboratories, North Chicago, Ill., a corporation of Illinois No Drawing. Application August 17, 1945, Serial No. 611,262

6 Claims. (Cl. 260—302)

The object of this invention is to prepare a therapeutic product and more specifically to prepare a dry, stable salt having the antibacterial activity of penicillin and suitable for therapeutic use.

Penicillin is an antibacterial substance which is produced by certain species of molds, including, for example, *Penicillium notatum*. The compound is known to be an acid and will form salts with bases such as calcium hydroxide and sodium hydroxide. The acid form of the material is unstable and rapidly loses its antibacterial activity. The salts are much more stable and when prepared in dry form and stored under protection from moisture the solid salt retains its antibacterial activity for a long time. Preparation of a dry stable product encounters numerous difficulties. Because of the sensitivity of the antibacterially active material to heat, acidity etc., special precautions have had to be taken in preparing a dry solid salt. It has been customary to use the process commonly called lyophylization. In this process, an aqueous solution of the salt previously freed from any organisms or solid particles is first frozen and then subjected to high vacuum to evaporate all the ice. This process is expensive since the cost of equipment is very high and the length of time required to dry a batch is relatively long.

It has been found that when a solution of penicillin (acid) in an appropriate organic solvent is treated with a solution of the right metallo organic compound, there is formed a precipitate of the desired penicillin salt. This precipitate, after being filtered off and dried, retains its antibacterial activity over long periods of time. It may be packaged in sealed glass ampoules which retain the solid in sterile condition. To prepare a solution of the salt of penicillin this salt is dissolved in sterile water or saline solution and is then ready for adminstration parenterally. It may also be applied topically or orally.

The following example has been selected to illustrate the invention:

The desired species of Penicillium (e. g. notatum, chrysogeneum etc.) is used to produce penicillin, by surface or deep culture methods as desired. When tests on the cultures show that the yield of penicillin is at a maximum the mixture is filtered to remove mold and other solid particles. The filtrate contains the antibacterial substance. The filtrate is cooled to nearly 0° C. and acidified to about pH 2 with a suitable acid such as phosphoric or sulfuric acid. The acidified aqueous solution is extracted with amyl acetate. This amyl acetate solution is then extracted with an aqueous buffer solution of pH 7 such as an aqueous solution containing 7% by weight of trisodium phosphate crystals, $Na_3PO_4.12H_2O$. Alternatively, we may use a dilute sodium hydroxide solution of such strength that the extract is neutral. This neutral aqueous solution cooled to nearly 0° C. is again acidified to about pH 2 and extracted with chloroform. Transfer from the chloroform solution to aqueous solution is accomplished by cautious addition of sodium hydroxide (conc.—5% by wt.) solution to an agitated mixture of the chloroform solution and water. The concentration of penicillin in the final water solution is approximately 50,000 units per cc. This water solution is passed through a filter of a type capable of removing bacteria.

500 cc. of the aqueous solution of penicillin is cooled to 2–3° C. and acidified, preferably with sulfuric or phosphoric acid, to approximately pH 2. It is then extracted three times with 150 cc., 100 cc., and 50 cc. portions of dry ether (free from alcohol). The temperature is kept below 5° C. during the extraction. The ether extracts are combined and sufficient ether added to adjust the concentration of penicillin to about 10,000 to 20,000 units per cc.

Penicillin salts may be precipitated from ether solutions as dilute as 500 units per cc. and as concentrated as 50,000 units per cc. We prefer to use ether solutions having a concentration of about 10,000 units per cc. Solutions of those concentrations give a finely divided easily filterable precipitate which can be readily handled. The ether solution is cooled to between —20° and —15° C. by means of a bath containing acetone and dry ice. The water in the ether solution solidifies rapidly and is removed by filtration. Removal of water at this point is essential to insure formation of a solid precipitate. Instead of using freezing and filtering to remove moisture, one may add a chemical drying agent such as anhydrous calcium sulphate, anhydrous sodium sulphate or a mixture of the two. After the drying agent has reacted with the moisture it is removed by filtration.

The solid remaining on the filter is washed with ether. The filtrate and washings are combined and an aliquot portion is titrated with a sodium butylate solution made by dissolving 5 gm. of freshly cut sodium in 200 cc. of butanol and filtering to remove insoluble material. This concentration of sodium butylate may vary considerably up to a saturated solution, and still operate satisfactorily. The titration is carried out by adding the sodium butylate solution to a mixture of 10 cc. of the ether solution of penicillin and 10 cc. of water until neutralization has been accomplished, using brom thymol blue as an indicator. A calculation can then be made to determine the volume of the sodium butylate solution necessary to precipitate the main body of the penicillin solution. The neutralization with sodium butylate can be run at room temperature without loss in yield.

The strongly agitated ether solution is neutralized by dropwise addition of the theoretical amount of sodium butylate solution. The fine precipitate of sodium penicillin is allowed to settle and the clear supernatant liquid poured off through a filter. The remaining suspension is poured onto the filter and without permitting the cake to become dry and crack, it is washed several times with dry ether. If allowed to become dry before thoroughly washed, the precipitate picks up moisture readily, but once washed it may be handled with ease in the open. After washing, the cake is sucked dry, broken up and the solvent removed in vacuo at room temperature. The solid is finally dried in high vacuum at 100° C. to reduce the moisture content and insure a product of satisfactory stability. For the preliminary drying of the cake an ordinary commercial vacuum of 25" to 27" is ample. For final drying, the pressure needs to be low enough to secure reasonably active evaporation without heating materially above the temperature given. We have secured excellent results in this respect by operating at an absolute pressure of 0.05 mm.

The recovery of penicillin is 90–100% based on assays of the original aqueous solution and the final dry precipitate.

It will be obvious to those skilled in the art that variations may be made in the above procedure without departing from the spirit of the invention. Instead of making several extractions, a single extraction with an equal volume of ether (free from alcohol) may be made and this will give a 90 to 95% recovery. The extraction may be made with a volume of ether such that the extract will contain about 50,000 units per cc. This extract may then be dried by freezing or by addition of a drying agent, and the dried extract subsequently diluted with dry ether to a concentration of about 10,000 units per cc. In working with large amounts (a billion units or more) where volumes are not accurately known, it may be easier to dissolve a sample of suspended precipitate in water and measure the pH. Then add sodium butylate solution until the desired pH is reached.

Mixed solvent processes may be used, provided the main solvent is diethyl ether. For example, the final extraction could be made from an aqueous solution to an amyl acetate solution and then diluted with ether to a point where complete precipitation will occur.

If a completely sterile final product is required, the final ether solution should be filtered again through a filter of the type capable of removing bacteria, which will also remove pyrogens. And after such filtering, all subsequent handling needs to be under completely aseptic conditions.

In place of sodium butylate, other alcoholates which may be used successfully are the isopropyl, propyl, n-amyl and n-octyl. Sodium ethylate is operative but the product is hygroscopic and more difficult to work with than those from the higher alcohols.

Without further elaboration, the foregoing will so fully explain the invention that others may readily adapt the same for use under varying conditions of service. It will, for instance, be obvious that the novel and advantageous features of the invention are equally applicable to natural products and to synthetic products identical with the natural product or susceptible to the same transformation.

We claim:

1. In the process of preparing a solid alkali metal salt of penicillin acid in which the salt is formed by reacting the penicillin acid with an alkali metal alcoholate, the improvement which comprises employing as said alkali metal alcoholate an alcoholate with an alcohol group containing at least three carbon atoms and up to and including eight carbon atoms, and in precipitating said alkali metal penicillin salt in an anhydrous ether medium.

2. The process of claim 1 in which the alkali metal alcoholate is sodium butylate.

3. In the process of preparing a solid alkali metal salt of penicillin acid, the improvement which comprises reacting the penicillin acid with an alkali metal alcoholate in an anhydrous ether reaction medium, and recovering the resulting alkali metal penicillin salt precipitate from the ether medium, the alcohol group of said alcoholate containing at least three carbon atoms and up to and including eight carbon atoms.

4. The process of claim 3 in which the alkali metal alcoholate is an alkali metal butylate.

5. In the process of preparing a solid salt of penicillin acid, the steps of mixing a solution of said acid in anhydrous ether with a solution of sodium butylate in butyl alcohol to precipitate the sodium salt of said acid; filtering off the solid product; and drying the same.

6. In the process of preparing a solid salt of penicillin acid, the steps of mixing a solution of said acid in anhydrous ether with a solution of sodium alcoholate to precipitate the sodium salt of said acid; filtering off the solid product; and drying the same, the alcohol group of said alcoholates containing at least 3 carbon atoms and up to and including eight carbon atoms.

NORMAN A. HANSEN.
JAMES W. MILNE.
WILLIAM C. RISSER.

REFERENCES CITED

The following references are of record in the file of this patent:

UNITED STATES PATENTS

| Number | Name | Date |
|---|---|---|
| 2,424,832 | Koerber | July 29, 1947 |
| 2,459,315 | Goldberg et al. | Jan. 18, 1949 |

OTHER REFERENCES

Abraham et al.: "The Lancet" (London), August 16, 1941, pages 179–180.

Meyers et al.: Science, July 3, 1942, pages 20–21.